(12) United States Patent
Suita et al.

(10) Patent No.: US 9,150,424 B2
(45) Date of Patent: Oct. 6, 2015

(54) LITHIUM TITANATE, METHOD FOR PRODUCING SAME, ELECTRODE ACTIVE MATERIAL CONTAINING THE LITHIUM TITANATE, AND ELECTRICITY STORAGE DEVICE USING THE ELECTRODE ACTIVE MATERIAL

(75) Inventors: Tokuo Suita, Yokkaichi (JP); Tomoyuki Sotokawa, Yokkaichi (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 523 days.

(21) Appl. No.: 13/642,815

(22) PCT Filed: Apr. 27, 2011

(86) PCT No.: PCT/JP2011/060231
§ 371 (c)(1),
(2), (4) Date: Oct. 22, 2012

(87) PCT Pub. No.: WO2011/136258
PCT Pub. Date: Nov. 3, 2011

(65) Prior Publication Data
US 2013/0045422 A1    Feb. 21, 2013

(30) Foreign Application Priority Data

Apr. 28, 2010  (JP) .................................. 2010-103083
Apr. 28, 2010  (JP) .................................. 2010-103084

(51) Int. Cl.
*H01M 4/485*   (2010.01)
*C01G 23/00*   (2006.01)
*H01G 11/30*   (2013.01)

(52) U.S. Cl.
CPC .............. *C01G 23/00* (2013.01); *C01G 23/003* (2013.01); *C01G 23/005* (2013.01); *H01G 11/30* (2013.01); *H01M 4/485* (2013.01); *C01P 2002/52* (2013.01); *C01P 2002/72* (2013.01); *C01P 2004/61* (2013.01); *C01P 2004/62* (2013.01); *C01P 2006/12* (2013.01); *C01P 2006/40* (2013.01); *Y02E 60/122* (2013.01); *Y02E 60/13* (2013.01)

(58) Field of Classification Search
None
See application file for complete search history.

(56) References Cited

FOREIGN PATENT DOCUMENTS

| CN | 101373829 | 2/2009 |
|---|---|---|
| CN | 101462765 | 6/2009 |
| CN | 101679066 | 3/2010 |
| JP | 6-275263 A | 9/1994 |
| JP | 10-287424 | 10/1998 |
| JP | 11-283624 A | 10/1999 |
| JP | 2000-277166 A | 10/2000 |
| JP | 2002-270175 A | 9/2002 |
| JP | 2008-130560 | 6/2008 |
| JP | 2009-054298 | 3/2009 |
| JP | 2009-245929 A | 10/2009 |
| JP | 2010-123424 | 6/2010 |
| JP | 2011-26188 A | 2/2011 |
| WO | WO 2008/111465 | 9/2008 |
| WO | WO 2009/028530 | 3/2009 |
| WO | WO 2009/028553 | 3/2009 |

OTHER PUBLICATIONS

Machine translation of JP 2011-026188, Feb. 2011.*
Chiba, K. et al. "Soft Chemical Synthesis and Electrochemical Properties of Layered Titanates" Proceedings of the 47th Battery Symposium, Nov. 21, 2006, Lecture No. 2P-08, pp. 602-603.

* cited by examiner

*Primary Examiner* — Jonathan Crepeau
(74) *Attorney, Agent, or Firm* — Paul E. White, Jr.; Manelli Selter PLLC

(57) ABSTRACT

Disclosed are: a novel lithium titanate; and a method for producing the novel lithium titanate. Specifically disclosed is a compound that has a chemical composition represented by the general formula (1): $Li_2Ti_{18}O_{37}$, or the compound additionally containing copper and/or tin. The compound represented by the general formula (1) is synthesized by causing a lithium compound to react with a compound that has a chemical composition represented by the general formula (2): $H_2Ti_{12}O_{25}$ in a liquid phase so that some of hydrogen ions contained in the compound represented by the general formula (2) are substituted by lithium ions, and then carrying out solid-liquid separation and thermal dehydration. An electricity storage device which uses, as a constituent member, an electrode that contains an electrode active material produced from the compound represented by the general formula (1) has excellent charge and discharge cycle characteristics, especially excellent charge and discharge cycle characteristics at high temperatures, and is expected to have high capacity.

14 Claims, 2 Drawing Sheets

LITHIUM TITANATE, METHOD FOR PRODUCING SAME, ELECTRODE ACTIVE MATERIAL CONTAINING THE LITHIUM TITANATE, AND ELECTRICITY STORAGE DEVICE USING THE ELECTRODE ACTIVE MATERIAL

This application is the national phase of international application PCT/JP2011/060231 filed 27 Apr. 2011 which designated the U.S.

TECHNICAL FIELD

The present invention relates to a novel lithium titanate and a method for producing the same, and further relates to an electrode active material containing the lithium titanate and an electricity storage device using the electrode active material.

BACKGROUND ART

A lithium secondary battery has rapidly spread recently because of excellent cycle properties. As the electrode active material, particularly the negative electrode active material, of a lithium secondary battery, a lithium-titanium composite oxide having high energy density and excellent in rate characteristics has spread, and on the other hand, a hydrogen titanate compound having high discharge potential and excellent in safety also attracts attention. There are known techniques of using, for example, a spinel-type lithium titanate of $Li_4Ti_5O_{12}$ (Patent Literature 1), a ramsdellite-type lithium titanate of $Li_2Ti_3O_7$ (Patent Literature 2), a lithium titanate of $Li_2Ti_{12}O_{25}$ (Patent Literature 3), a hydrogen titanate compound of $H_2Ti_{12}O_{25}$ (Patent Literature 4), a bronze-type titanium dioxide (Non Patent Literature 1), and the like, as an electrode active material. There is also known a technique of coating a surface of the spinel-type or ramsdellite-type lithium titanate with a cuprate such as copper oxide thereby reduce the decomposition of an electrolyte solution to suppress generation of a gas (Patent Literature 5).

CITATION LIST

Patent Literature

Patent Literature 1: JP 2002-270175 A
Patent Literature 2: JP 11-283624 A
Patent Literature 3: JP 2011-26188 A
Patent Literature 4: WO 2008/111465
Patent Literature 5: JP 2009-245929 A

Non Patent Literature

Non Patent Literature 1: Kazuki Chiba et al., "Soft Chemical Synthesis and Electrochemical Properties of Layered Titanates", Proceedings of the 47th Battery Symposium, Nov. 21, 2006, Lecture No. 2P-08

SUMMARY OF INVENTION

Technical Problem

An object of the present invention is to provide a lithium titanate more excellent in battery characteristics, particularly, excellent in high temperature cycle properties.

Solution to Problem

As a result of exhaustive studies to solve such problems, the present inventors have found that a compound having a chemical composition represented by the general formula: $Li_2Ti_{18}O_{37}$ (formula 1) is a novel lithium titanate; and have further found that a battery using this compound as an active material exhibits excellent battery characteristics, particularly, high temperature cycle properties, and when copper and/or tin is contained in the lithium titanate, the battery exhibits more excellent high temperature cycle properties. These findings have led to the completion of the present invention.

Specifically, the present invention provides:
(1) A compound having a chemical composition represented by general formula: $Li_2Ti_{18}O_{37}$ (formula 1);
(2) The compound according to the above (1), further containing copper and/or tin;
(3) An electrode active material for an electricity storage device containing a compound according to the above (1) or (2); and
(4) An electricity storage device comprising a positive electrode, a negative electrode, a separator, and an electrolyte, wherein the positive electrode or the negative electrode contains the electrode active material according to the above (3).

Advantageous Effects of Invention

When the novel lithium titanate of the present invention is used as an electrode active material, it provides an electricity storage device excellent in battery characteristics, particularly, excellent in high temperature cycle properties.

DESCRIPTION OF EMBODIMENTS

Figure 1:
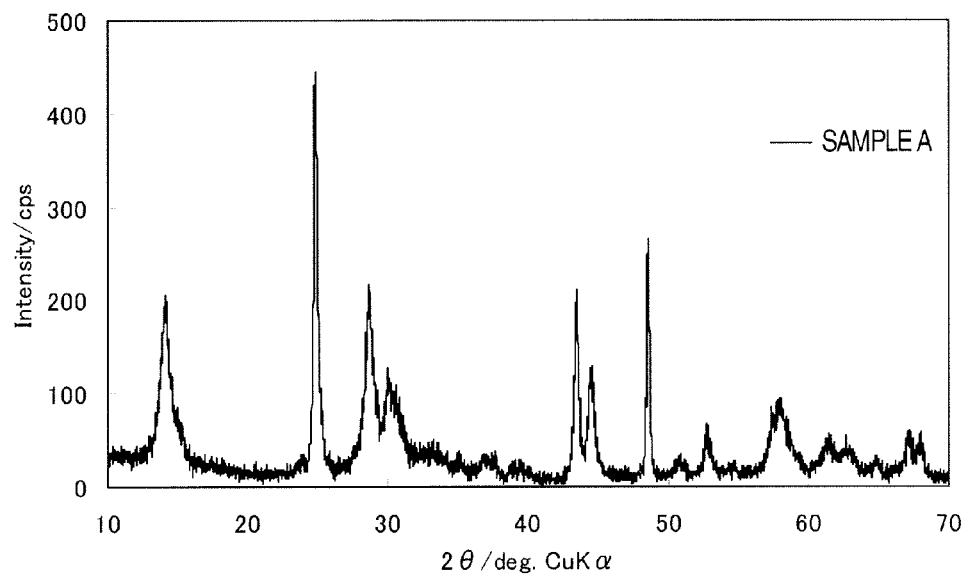
FIG. 1 is a powder X-ray diffraction pattern of $Li_{1.7}Ti_{18}O_{37}$ (Example 1) of the present invention as measured using the CuKα radiation.

The novel lithium titanate of the present invention has a chemical composition represented by the general formula: $Li_2Ti_{18}O_{37}$ (formula 1).

As described below, the present lithium titanate is obtained by replacing part of hydrogen ions contained in a hydrogen titanate compound having a chemical composition represented by the general formula: $H_2Ti_{12}O_{25}$ (formula 2) with lithium ions, followed by thermally dehydrating remaining hydrogen ions as water. Therefore, it is presumed that the crystal structure of the hydrogen titanate compound of formula 2 is basically held. Specifically, titanium oxide forms a skeletal structure as disclosed in Patent Literature 4 and a one-dimensional tunnel structure is formed by the skeletal structure; and, in the present lithium titanate, lithium ions are present in the tunnel and support the tunnel structure. Therefore, when it is used as an electrode active material, it will be possible to intercalate electrolytic ions contained in an electrolyte solution in a large amount in the tunnel, and it is believed that the tunnel structure ensures a one-dimensional conduction path and facilitates the movement of ions in the tunnel direction. Particularly, if the electrolytic ions are lithium ions, since the ions are identical with the ions supporting the tunnel structure, a load accompanying the intercalation and deintercalation of the electrolytic ions is unlikely to be placed on the crystal structure. Therefore, it is presumed that the resulting battery is excellent in cycle properties.

Therefore, the present lithium titanate is suitable as the electrode active material of the electrode materials for electricity storage devices.

The present lithium titanate has peaks at least at positions of 2θ of 14.1±0.5°, 24.8±0.5°, 28.7±0.5°, 30.3±0.5°, 43.4±0.5°, 44.6±0.5°, 48.5±0.5°, 53.0±0.5°, 58.3±0.5°, 61.4±0.5°, 63.1±0.5°, 65.2±0.5°, 67.5±0.5°, and 68.1±0.5°, in the X-ray powder diffraction pattern measured with CuKα radiation. Such a diffraction pattern has not been observed in the lithium titanates having known crystal structures. For example, the conventionally known spinel-type crystal ($Li_4Ti_5O_{12}$) has main diffraction peaks at 2θ of 18.3°, 35.6°, 43.3°, 57.2°, 62.8°, and 66.1° (refer to JCPDS card No. 26-1198), and the ramsdellite-type crystal ($Li_2Ti_3O_7$) has main diffraction peaks at 20.0°, 33.3°, 35.8°, 36.5°, 40.2°, 45.7°, 46.0°, 51.5°, 52.9°, 60.6°, 64.8°, and 66.8° (refer to JCPDS card No. 34-393), which are different from the diffraction pattern of the present lithium titanate. Therefore, it is believed that the present lithium titanate has a novel crystal structure.

Common inorganic compounds having crystallinity are known to maintain the crystal structure even if they have a chemical composition that is a little outside of the stoichiometry due to the partial deficiency or excess produced in the constituent elements, or even if the constituent elements are replaced with a small amount of different elements (refer to JP 06-275263 A, JP 2000-277166 A, and the like), and it is believed that the novel lithium titanate of the present invention is also the same. In particular, in the present lithium titanate, the lithium ions are present in the tunnel structure of the titanium oxide skeleton as described above, and the lithium ions are easily deintercalated although they are fixed in the tunnel. For example, they may be partially deintercalated in the water washing in the production process. In this case, since the above X-ray diffraction pattern is shown even if lithium is deficient to the range where the Ti/Li ratio is 14.0 at the maximum, these lithium titanates are also included in the present invention. Note that in the present lithium titanate, since it hardly occurs that titanium ions are deficient from the skeletal structure or excessive lithium is fixed in the tunnel, the minimum value of the Ti/Li ratio will be about 9.

The present lithium titanate, when it further contains copper and/or tin, is preferred because more excellent high temperature cycle properties will be obtained. Copper and/or tin may be contained in the present lithium titanate as a compound such as an oxide or a hydroxide, or as metal, an alloy, or the like. Above all, it is preferred that copper and/or tin is contained in a state supported on the particle surface of the present lithium titanate. The supporting state may be a continuous layer having a uniform thickness or a continuous layer having a nonuniform thickness. The supporting state may be a discontinuous layer which is present in an island shape. The content of copper and/or tin is preferably in the range of 0.001/1 to 0.1/1, more preferably in the range of 0.005/1 to 0.05/1 in terms of the amount of copper, the amount of tin, or the total amount thereof relative to the amount of titanium contained in the lithium titanate.

The average particle size (median size by a laser scattering method) of the lithium titanate of the present invention is not particularly limited, but it is generally in the range of 0.05 to 10 μm, more preferably in the range of 0.1 to 2 μm. The particle shape may be any of isotropic shapes such as spherical and polyhedral ones, anisotropic shapes such as rod-like and plate-like ones, irregular shapes, and the like, and is not particularly limited. It is preferred that the primary particles of this compound are aggregated to a secondary particle because powder characteristics such as fluidity, adhesion and packing will be improved, and when it is used as an electrode active material, battery characteristics such as cycle properties will also be improved. The secondary particle in the present invention is in the state where primary particles are firmly bonded together, and it is not easily crumbled by industrial operations such as usual mixing, disintegration, filtration, water washing, transportation, weighing, bagging and pilling and almost remains as a secondary particle. The average particle size (median size by a laser scattering method) of the secondary particles is preferably in the range of 0.1 to 20 μm. The specific surface area (according to the BET method by $N_2$ adsorption) is not particularly limited, but it is preferably in the range of 0.1 to 100 $m^2/g$, more preferably in the range of 1 to 100 $m^2/g$. The particle shape is also not limited as in the primary particle, and various shapes can be used.

The particle surface of the primary particles or secondary particles of the present lithium titanate may be coated with at least one selected from the group consisting of carbon, inorganic compounds such as silica and alumina, and organic compounds such as a surfactant and a coupling agent besides copper and tin. These coating species may be used individually, or may be laminated in two or more layers, or may be used as a mixture or a composite compound. In particular, coating with carbon is preferred when used as an electrode active material because electrical conductivity is improved. The coating amount of carbon is preferably in the range of 0.05 to 10% by weight in terms of C relative to the compound of formula 1. The amount less than this range cannot provide a desired electrical conductivity, and the amount more than the range instead reduces the characteristics. More preferred content is in the range of 0.1 to 5% by weight. Note that the content of carbon can be analyzed by a CHN analyzing method, a high-frequency combustion method, or the like. Further, different elements other than titanium and lithium can be contained in the crystal lattice by doping in the range of not inhibiting the above crystal form.

The lithium titanate of the present invention is obtained by a production method comprising the steps of: (1) allowing a compound having a chemical composition represented by the general formula: $H_2Ti_{12}O_{25}$ (formula 2) to react with a lithium compound in a liquid phase to obtain a compound having a chemical formula represented by the general formula: $H_{2/3}Li_{4/3}Ti_{12}O_{25}$ (formula 3) (first step); and (2) subjecting the compound of formula 3 to solid-liquid separation followed by thermal dehydration (second step) (referred to as production method I).

First, in the first step, part of hydrogen ions contained in the compound of formula 2 is replaced with lithium ions to obtain the compound of formula 3. The reaction in a liquid phase is preferably performed in a slurry, and more preferably the slurry is prepared by using an aqueous medium. When an aqueous medium is used, it is preferred to use a water-soluble lithium compound such as lithium hydroxide and lithium carbonate. The reaction temperature is preferably 80° C. or higher, more preferably 300° C. or lower, further preferably in the range of 80 to 200° C. When the reaction is performed at 100° C. or higher, a pressure-resistant container such as an autoclave is preferably used.

Then, in the second step, the compound of formula 3 is subjected to solid-liquid separation. Washing, drying, and the like may be optionally performed. Subsequently, the compound of formula 3 is heated to dehydrate and remove the remaining hydrogen ions with the oxygen in the compound to obtain the present lithium titanate.

In order to allow the present lithium titanate to contain copper and/or tin, various methods can be suitably selected and used depending on coating species, the methods including dry coating treatment methods such as a CVD method and a sputtering technique, wet coating treatment methods such as a sol gel process and electroless plating, and mixing/grinding combination treatment methods such as a ball mill method and a jet mill method. In addition, for example, when the particle surface of the present lithium titanate is allowed to support an oxide of copper and/or tin, it may be performed by adding a water-soluble compound of copper and/or tin to an aqueous slurry in which the present lithium titanate is dispersed, followed by neutralization.

Alternatively, the method for producing the lithium titanate of the present invention may also include a method comprising the steps of: (1) allowing the compound having a chemical composition of formula 2 ($H_2Ti_{12}O_{25}$) to react with a copper compound and/or a tin compound so that the amount of copper, the amount of tin, or the total amount thereof may be in the range of 0.001/1 to 0.1/1 relative to the amount of titanium contained in the compound of formula 1 to obtain a reaction product (A) (first step); (2) allowing the reaction product (A) to react with a lithium compound in a liquid phase so that the amount of lithium is equivalent or more to the amount of copper, the amount of tin, or the total amount thereof contained in the reaction product (A) to obtain a reaction product (B) (second step); and (3) subjecting the reaction product (B) to solid-liquid separation followed by thermal dehydration (third step) (referred to as production method II).

Also by this method, a coating containing copper and/or tin is formed, or a coating containing a major portion of copper and/or tin is formed, wherein a part thereof is believed to be contained in the crystal lattice of the present lithium titanate. Since the novel lithium titanate of the present invention is believed to have a one-dimensional tunnel structure, cations such as hydrogen ions and alkali metal ions derived from a neutralizing agent are easily intercalated in the tunnel structure in the above known methods. Therefore, production method II is more suitably applied to obtain the present lithium titanate.

In the first step, the compound of formula 2 may be allowed to react with a copper compound and/or a tin compound by using a method of mixing these compounds in a liquid phase to bring them into contact with each other or by mixing these compounds in a solid phase to bring them into contact with each other followed by heating. When the reaction is performed in a liquid phase, the reaction is preferably performed in a slurry, more preferably performed in a slurry using an aqueous medium. When an aqueous medium is used, a water-soluble compound such as copper chloride and ammonium copper chloride is preferably used as a copper compound, and tin chloride, sodium stannate, and the like are preferred as a tin compound. The compound of formula 2 is a compound having a tunnel structure in which hydrogen ions are intercalated into the tunnel, and when the compound of formula 2 is allowed to react with a copper compound, a tin compound, or the like in the above range, it is presumed that part of the hydrogen ions in the tunnel structure is replaced with copper ions, tin ions, or the like.

The reaction of the second step of allowing the reaction product (A) to react with a lithium compound in a liquid phase is preferably performed in a slurry, more preferably performed in a slurry using an aqueous medium. When an aqueous medium is used, it is preferred to use a water-soluble lithium compound such as lithium hydroxide and lithium carbonate as the lithium compound. The reaction temperature is preferably 80° C. or higher, more preferably 300° C. or lower, further preferably in the range of 80 to 200° C. When the reaction is performed at 100° C. or higher, a pressure-resistant container such as an autoclave is preferably used. The reaction of the reaction product (A) with a lithium compound is preferably adjusted so that all of the copper ions and/or tin ions and a part of the hydrogen ions are replaced with lithium ions by adjusting the amount of lithium is more than the equivalent to the amount of copper, the amount of tin, or the total amount thereof contained in the reaction product (A).

For example, when obtaining the compound of formula 1, it is preferred to allow the reaction product (A) to react with a lithium compound so that the molar ratio of hydrogen to lithium contained in the reaction product (B) may be in a range of 0.5/1 to 1.5/1. The reaction of the reaction product (A) with the lithium compound replaces the copper ions, tin ions, or the like within the tunnel structure of the reaction product (A) with lithium ions.

It is believed that these ions deintercalated from the inside of the tunnel structure allow copper hydroxide, tin hydroxide, or the like to be produced. In the second step, accordingly, it is presumed that the reaction product (B) is in a state where the produced copper hydroxide, tin hydroxide, or the like is supported on the surface of the particles essentially comprising the compound in which hydrogen ions and lithium ions are intercalated into the tunnel structure; or in a state where a part of the produced copper hydroxide, tin hydroxide, or the like is supported on the surface of particles, and the copper hydroxide, tin hydroxide, or the like which is not supported is present in the liquid phase; or in a state where all of the produced copper hydroxide, tin hydroxide, or the like are present in the liquid phase.

It is presumed that a part or all of the copper hydroxide, tin hydroxide, or the like in the liquid phase is supported on the surface of the particles when performing solid-liquid separation in the third step to be described below.

In the third step, the resulting reaction product is subjected to solid-liquid separation followed by thermal dehydration. Washing, drying, and the like may be optionally performed. The present lithium titanate is formed in this step, and at the same time, it is believed that, from the copper hydroxide and/or tin hydroxide supported on the particle surface of the reaction product, copper oxide, tin oxide, metal copper, metal tin, or the like is produced to form a supporting layer containing the copper element and/or tin element.

The compound of formula 2 used in the production methods I and II can be obtained by known methods, for example, a method disclosed in Patent Literature 4. Specifically, the compound can be obtained by a method comprising the steps of: (1) firing a mixture of a sodium compound and titanium oxide at a temperature of 600° C. or higher to obtain a compound having a chemical composition of the general formula: $Na_2Ti_3O_7$ (formula 4); (2) allowing the compound of formula 4 to react with an acidic solution to obtain a compound having a chemical composition of the general formula: $H_2Ti_3O_7$ (formula 5); and thermally dehydrating the compound of formula 5 in air or in a vacuum at a temperature in the range of 150° C. or higher and lower than 280° C.

In the second step of the production method I and in the third step of the production method II, the heating temperature is preferably in the range of 300 to 600° C. If the heating temperature is lower than 300° C., dehydration will be insufficient and the desired lithium titanate will be hardly obtained, and if it is higher than 600° C., titanium dioxide of a bronze type, an anatase type, or the like will be partially produced. The lithium titanate obtained is optionally washed and subjected to solid-liquid separation before it is dried. Alternatively, depending on the degree of aggregation of particles, it may be ground by using known equipment, in the range where the effect of the present invention is not impaired.

The secondary particles of the present lithium titanate can also be obtained in the present production method. Examples of such a method include, in the production method I, (1) a method of allowing the secondary particles of the compound of formula 2 to react with a lithium compound in the first step; (2) a method of granulating the obtained primary particles of the compound of formula 3 to form secondary particles followed by thermal dehydration in the second step; and (3) a method of granulating the primary particles of the compound of formula 1 obtained in the second step to form secondary particles.

Furthermore, the secondary particles of the present lithium titanate containing copper and/or tin can also be obtained. Examples include, in the production method II, (1) a method of allowing the secondary particles of the compound of formula 2 to react with a copper compound and/or a tin compound in the first step; (2) a method of granulating the primary particles of the reaction product (A) obtained in the first step to form secondary particles followed by allowing them to react with a lithium compound in the second step; (3) a method of granulating the primary particles of the reaction product (B) to form secondary particles followed by thermal dehydration in the third step; and (4) a method of granulating the primary particles of the present lithium titanate containing copper and/or tin obtained in the third step to form secondary particles.

In either of the production methods I and II, when the method of (1) is used, the secondary particles of the compound of formula 2 may be prepared by obtaining the primary particles of the compound of formula 2 followed by granulating to form the secondary particles, or may also be obtained by either of the following methods including: granulating a sodium compound and titanium oxide to form secondary particles, which are then fired, allowed to react with an acidic solution, and subjected to thermal dehydration; or obtaining the primary particles of the compound of formula 4, followed by granulating to form secondary particles, which are allowed to react with an acidic compound and subjected to thermal dehydration; or obtaining the primary particles of the compound of formula 5 followed by granulating to form secondary particles, which are subjected to thermal dehydration. The granulation includes drying granulation, stirring granulation and compression granulation, and drying granulation is preferred because it can easily control the particle size and shape of secondary particles. The drying granulation includes the following methods including: dehydrating a slurry containing a compound of any of (formula 1) to (formula 5), any of the reaction products (A) and (B), a sodium compound, titanium oxide, and the like, followed by drying and grinding; dehydrating the slurry followed by molding and drying; and spray drying the slurry. Above all, spray drying is industrially preferred.

The spray drier used in spray drying may be suitably selected from a disk type drier, a pressure nozzle type drier, a two-fluid nozzle type drier, a four-fluid nozzle type drier, and the like depending on the properties of the slurry and the processing capability of the drier. The control of the secondary particle size may be made by adjusting the concentration of solids in the slurry or by controlling the size of liquid droplets sprayed, for example, in the case of the disk type drier, by regulating the rotation frequency of the disk, and in the cases of a pressure nozzle type, a two-fluid nozzle type and a four-fluid nozzle type driers and the like, by regulating the spray pressure and the nozzle diameter. With respect to the drying temperature, the inlet temperature is preferably in the range of 150 to 250° C., and the outlet temperature is preferably in the range of 70 to 120° C. An organic binder may be used in the case where the slurry has a low viscosity and is hard to be used for granulation, or may be used in order to further facilitate the control of the particle size. Examples of the organic binders to be used include (1) vinyl compounds (polyvinyl alcohol, polyvinylpyrrolidone, and the like), (2) cellulosic compounds (hydroxyethylcellulose, carboxymethylcellulose, methylcellulose, ethylcellulose, and the like), (3) protein compounds (gelatin, gum arabic, casein, sodium caseinate, ammonium caseinate, and the like), (4) acrylate compounds (sodium polyacrylate, ammonium polyacrylate, and the like), (5) natural polymeric compounds (starch, dextrin, agar, sodium alginate, and the like), and (6) synthetic polymeric compounds (polyethylene glycol, and the like). At least one selected from these can be used. Above all, compounds containing no inorganic component such as sodium are more preferred because they are easily decomposed and volatilized by heat treatment.

The electricity storage device using the electrode containing the lithium titanate of the present invention as an electrode active material has high capacity, is excellent in high temperature cycle properties, and allows a reversible lithium intercalation/deintercalation reaction, and high reliability can be expected. Furthermore, when the lithium titanate containing copper and/or tin is used as an active material, an electricity storage device having more excellent battery characteristics and, particularly, excellent in high temperature cycle properties can be obtained.

The electricity storage device specifically includes a lithium battery and a capacitor. These include a positive electrode, a negative electrode, a separator, and an electrolyte, and the electrodes are obtained by adding a conducting material such as carbon black and a binder such as a fluororesin to the electrode active material, followed by suitably molding or coating the mixture. In the case of a lithium battery, the electrode active material is used as a positive electrode, and metal lithium, a lithium alloy or the like, or a carbonaceous material such as graphite, or the like can be used as a counter electrode. Alternatively, the electrode active material is used as a negative electrode, and as a positive electrode, there can be used a lithium-transition metal composite oxide such as a lithium-manganese composite oxide, a lithium-cobalt composite oxide, a lithium-nickel composite oxide, and a lithium-vanadium composite oxide, and an olivine type compound such as a lithium-iron-phosphate composite compound, and the like. Furthermore, the electrode active material of the present invention may be mixed with a known active material to produce the electrode. In the case of a capacitor, an asymmetric capacitor can be made in which the present electrode active material and graphite are used. As the separator, a porous polyethylene film and the like are used for any devices, and as the electrolyte solution, a material in common use can be used, such as a solution in which a lithium salt such as $LiPF_6$, $LiClO_4$, $LiCF_3SO_3$, $LiN(CF_3SO_2)_2$ or $LiBF_4$ is dissolved in a solvent such as propylene carbonate, ethylene carbonate or dimethyl carbonate.

EXAMPLES

Hereinafter, Examples of the present invention will be described, but the present invention is not limited thereto.

Example 1

Novel Lithium Titanate (First Step)

To 1000 g of a commercially available rutile-type high-purity titanium dioxide (PT-301: manufactured by Ishihara Sangyo Kaisha Ltd.) and 451.1 g of sodium carbonate, was added 1284 g of pure water, and the mixture was stirred to form a slurry. The slurry was spray-dried using a spray drier (MDL-050C type: manufactured by Fujisaki Electric Co., Ltd.) under the conditions of an inlet temperature of 200° C. and an outlet temperature of 70 to 90° C. The obtained spray-dried product was heated and fired in the air at a temperature of 800° C. for 10 hours using an electric furnace to obtain the compound of formula 4: $Na_2Ti_3O_7$.

To 1077 g of the obtained $Na_2Ti_3O_7$, was added 4310 g of pure water to obtain a dispersed slurry. To 4848 g of this slurry, was added 711 g of 64% sulfuric acid, and the mixture was allowed to react with each other under the condition of 50° C. for 5 hours with stirring, followed by filtration and water washing. Pure water was added to the filtration cake until the total amount of 3370 g was reached then the cake was redispersed, and thereto was added 44.6 g of 64% sulfuric acid. The resulting mixture was allowed to react with each other under the condition of 70° C. for 5 hours with stirring, followed by filtration, water washing, and drying to obtain the compound of formula 5: $H_2Ti_3O_7$.

The obtained $H_2Ti_3O_7$ in an amount of 300 g was thermally dehydrated in the air at 260° C. for 10 hours using an electric furnace to obtain the compound of formula 2: $H_2Ti_{12}O_{25}$ (Sample a). The validity of the chemical composition was evaluated by measuring the loss on heating of the sample in a temperature range of 250 to 600° C. using a thermogravimeter/differential thermal analyzer, and when the chemical composition was calculated on the assumption that the loss on heating corresponds to constitution water, the chemical composition of $H_2Ti_{12}O_{25}$ was verified to be valid.

To 258.3 g of the obtained $H_2Ti_{12}O_{25}$, were added 1 liter of pure water and an aqueous solution in which 35.18 g of lithium hydroxide monohydrate was dissolved in 500 ml of pure water, and then the resulting mixture was charged into an autoclave and allowed to react with each other at 120° C. for 5 hours with stirring to obtain the compound of formula 3: $H_{2/3}Li_{4/3}Ti_{12}O_{25}$. The loss on heating of the sample in a temperature range of 250 to 600° C. was measured using a thermogravimeter/differential thermal analyzer, and when the chemical composition was calculated on the assumption that the loss on heating corresponds to constitution water, the chemical composition of $H_{2/3}Li_{4/3}Ti_{12}O_{25}$ was verified to be valid. Note that the actual content of lithium and titanium was measured and verified by ICP atomic emission spectroscopy.

(Second Step)

The obtained $H_{2/3}Li_{4/3}Ti_{12}O_{25}$ was filtered, washed with water, and dried, and then heat-treated at a temperature of 400° C. for 10 hours to obtain the novel lithium titanate of the present invention. (Sample A)

Example 2

Novel Lithium Titanate Containing Copper

The compound of formula 2: $H_2Ti_{12}O_{25}$ (Sample a) obtained in the first step of Example 1 in an amount of 258.3 g was dispersed in 1 liter of pure water, and thereto was added an aqueous solution in which 13.29 g of ammonium copper chloride dihydrate ($Cu(NH_4)_2Cl_2.2H_2O$) was dissolved in 200 ml of pure water (Cu/Ti=0.015). The mixture was stirred for 30 minutes to allow the compounds to react with each other to obtain a reaction product (A)-(1).

(Second Step)

To a slurry of the obtained reaction product (A)-(1), was added an aqueous solution in which 35.18 g of lithium hydroxide monohydrate ($LiOH.H_2O$) was dissolved in 300 ml of pure water, and then the resulting mixture was charged into an autoclave and allowed to react with each other at 120° C. for 5 hours with stirring to obtain a reaction product (B)-(1). Part of the sample was collected and measured for the content of Cu, Li, and Ti by ICP atomic emission spectroscopy, and the loss on heating of the sample in a temperature range of 250 to 600° C. was measured using a thermogravimeter/differential thermal analyzer. When the chemical composition was calculated on the assumption that the loss on heating corresponds to constitution water, it was verified that Cu/Ti was 0.015/1; H/Ti was 0.074/1; and Li/Ti was 0.078/1, in a molar ratio.

(Third Step)

The obtained reaction product (B)-(1) was filtered, washed with water, and dried, and then heat-treated at a temperature of 400° C. for 10 hours to obtain the novel lithium titanate containing copper of the present invention. (Sample B)

Example 3

Novel Lithium Titanate Containing Tin (First Step)

The compound of formula 2: $H_2Ti_{12}O_{25}$ (Sample a) obtained in the first step of Example 1 in an amount of 10.2 g was dispersed in 80 ml of pure water, and thereto was added 0.50 g of sodium stannate trihydrate ($Na_2SnO_3.3H_2O$) (Sn/Ti=0.015). The mixture was stirred for 30 minutes to allow the compounds to react with each other to obtain a reaction product (A)-(2).

(Second Step)

To a slurry of the obtained reaction product (A)-(2), was added 1.39 g of lithium hydroxide monohydrate ($LiOH.H_2O$), and then the resulting mixture was charged into an autoclave and allowed to react with each other at 120° C. for 5 hours with stirring to obtain a reaction product (B)-(2). The reaction product was measured for the content of Sn, Li, and Ti by ICP atomic emission spectroscopy, and the loss on heating of the sample in a temperature range of 250 to 600° C. was measured using a thermogravimeter/differential thermal analyzer. When the chemical composition is calculated on the assumption that the loss on heating corresponds to constitution water, Sn/Ti is 0.00054/1; H/Ti is 0.071/1; and Li/Ti is 0.1126/1, in a molar ratio.

(Third Step)

The obtained reaction product (B)-(2) was filtered, washed with water, and dried, and then heat-treated at a temperature of 400° C. for 10 hours to obtain the novel lithium titanate containing a tin compound of the present invention. (Sample C)

Comparative Example 1

The compound obtained in the first step of Example 1 (formula 2) was used as a compound of a comparative object. (Sample a)

Evaluation 1

Confirmation of Crystallinity

Figure 2:
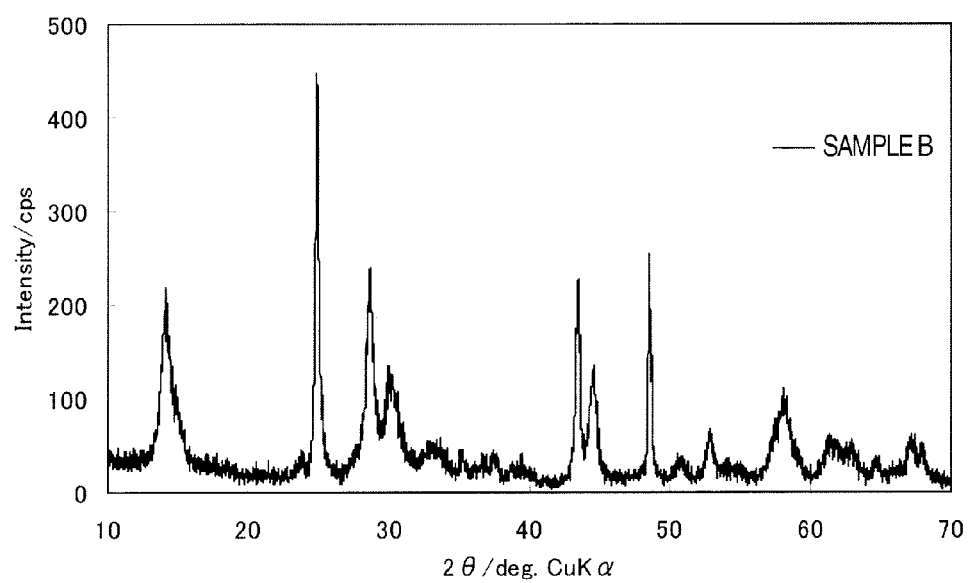
FIG. 2 is a powder X-ray diffraction pattern of $Li_{1.4}Ti_{18}O_{37}$ containing copper (Example 2) of the present invention as measured using the CuKα radiation.
Figure 3:
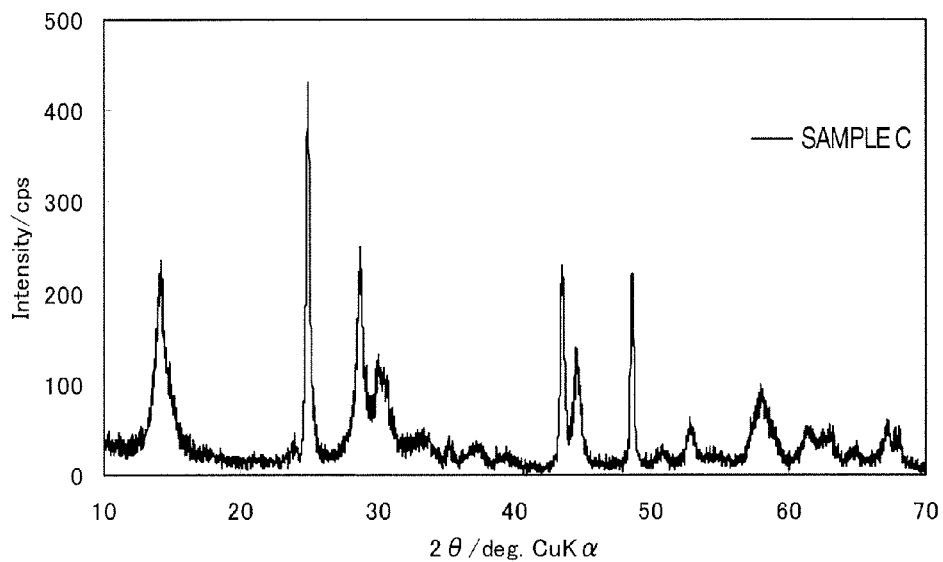
FIG. 3 is a powder X-ray diffraction pattern of $Li_{2.0}Ti_{18}O_{37}$ containing tin (Example 3) of the present invention as measured using the CuKα radiation.

The compounds obtained in Examples 1 to 3 (Samples A to C) were subjected to X-ray diffraction measurement with a powder X-ray diffractometer using CuKα radiation, and were found to be monoclinic crystals having good crystallinity. Further, the X-ray diffraction patterns of Samples A to C were found to be different from known lithium titanates such as a spinel type (for example, refer to JCPDS card No. 26-1198) and a ramsdellite type (for example, refer to JCPDS card No. 34-393). Therefore, it has been determined that each is a novel compound. Each X-ray diffraction pattern is shown in FIGS. 1 to 3.

Evaluation 2

Confirmation of Composition

The compounds obtained in Examples 1 to 3 (Samples A to C) were dissolved in fluoric acid and measured for the content of titanium, lithium, copper, and tin by ICP atomic emission spectroscopy. Further, the loss on heating of these samples in a temperature range of 250 to 600° C. was measured using a thermogravimeter/differential thermal analyzer. The loss on heating of Samples A to C was 0.00% by weight, based on which it was considered that, on the assumption that the loss on heating corresponds to constitution water, all of the constitution water was removed and the samples were each converted to an oxide. Then, the molar ratios of oxygen to titanium were identified on the assumption that there is no deficiency of titanium ions. The chemical composition has been determined from the molar ratios and the analytical values of titanium and lithium as described above. The results are shown in Table 1. Sample C is a compound having the chemical composition of formula (1), and, on the other hand, it turns out that lithium deficiency has occurred in Samples A and B. However, as shown in the above FIGS. 1 to 3, the X-ray diffraction patterns of Samples A and B are almost the same as that of Sample C, which shows that Samples A and B are also compounds included in the novel lithium titanate of the present application.

TABLE 1

| | Sample | Ti(%) (as-is) | Li(%) (as-is) | Cu(%) (as-is) | Sn(%) (as-is) | Loss on heating (wt %) | Ti/Li ratio | Composition formula |
|---|---|---|---|---|---|---|---|---|
| Example 1 | A | 58.8 | 0.82 | 0.00 | 0.00 | 0.00 | 10.4 | $Li_{1.7}Ti_{18}O_{37}$ |
| Example 2 | B | 58.3 | 0.65 | 1.16 | 0.00 | 0.00 | 13.0 | $Li_{1.4}Ti_{18}O_{37}$ |
| Example 3 | C | 60.1 | 0.98 | 0.00 | 0.08 | 0.00 | 8.9 | $Li_{2.0}Ti_{18}O_{37}$ |

Evaluation 3

Evaluation of High Temperature Cycle Properties

A lithium secondary battery was prepared using any of the compounds obtained in Examples 1 to 3 and Comparative Example 1 (Samples A to C, a) as an electrode active material, and the charge and discharge characteristics of the battery were evaluated. The structure and measurement conditions of the battery will be described.

Each of the above samples, an acetylene black powder as a conducting agent, and a polytetrafluoroethylene resin as a binder were mixed in a weight ratio of 50:40:10, kneaded together in a mortar, and extended into a sheet form. The sheet was cut into a circle shape having a diameter of 10 mm and a weight of 10 mg, inserted between two aluminum meshes similarly cut into a circle shape having a diameter of 10 mm, and pressed at 9 MPa, thus producing a positive electrode.

The positive electrode was vacuum-dried at a temperature of 220° C. for 4 hours, and then incorporated into a coin-type cell, which can be hermetically sealed, in a glove box having a dew point of −70° C. or lower. A coin-type cell made of stainless steel (SUS316) and having an outside diameter of 20 mm and a height of 3.2 mm was used. A metallic lithium cut into a circle shape having a thickness of 0.5 mm and a diameter of 12 mm was compression bonded to a copper foil, and the resulting laminate was used as a negative electrode. A mixed solution of ethylene carbonate and dimethyl carbonate (mixed in a volume ratio of 1:2) in which $LiPF_6$ was dissolved in a concentration of 1 mol/liter was used as a nonaqueous electrolyte solution.

The positive electrode was placed on the lower can of the coin-type cell; a porous polypropylene film was placed as a separator on the positive electrode; and a nonaqueous electrolyte solution was dropped on the film. Further, on the film was placed the negative electrode, on which was placed a spacer having a thickness of 0.5 mm and a spring (all made of SUS316) for adjusting thickness, which were covered with an upper can with a gasket made of polypropylene, and then the outer peripheral part was caulked and hermetically sealed.

Figure 4:
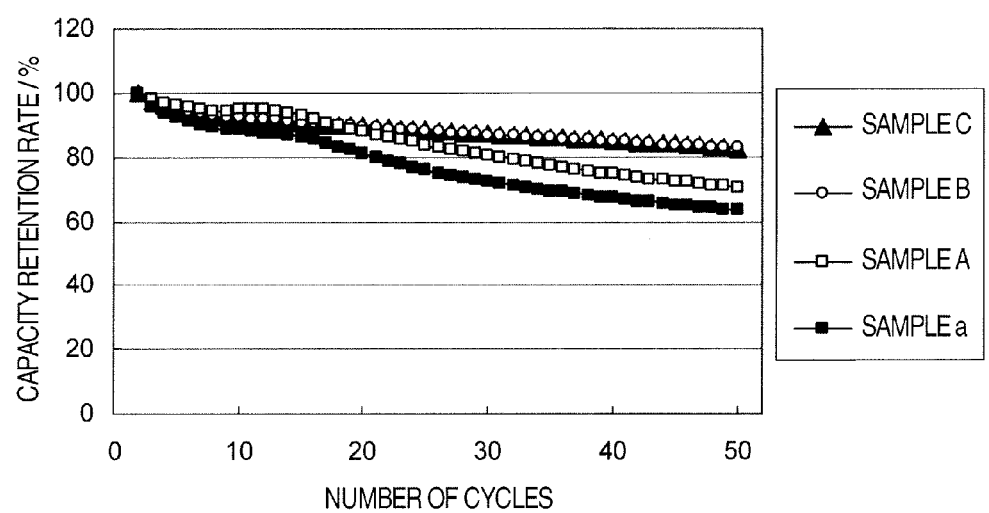
FIG. 4 is a view showing the high temperature cycle properties of the present invention (Examples 1 to 3) and $H_2Ti_{12}O_{25}$ (Comparative Example 1) as a comparative object.

The prepared lithium secondary battery was charged and discharged for 50 cycles at a charge and discharge current of 0.25 mA and a cutoff potential of 1.0 V to 2.5 V in a thermostat bath of 60° C. The discharge capacity at the second cycle and the 50th cycle was used to calculate (discharge capacity at the 50th cycle/discharge capacity at the second cycle)×100, which was defined as high temperature cycle properties. The results are shown in Table 2. Further, capacity retention rates were varied as shown in FIG. 4. From the above, it turns out that the lithium titanate of the present invention is excellent in high temperature cycle properties, and the lithium titanate containing copper and/or tin is more excellent in high temperature cycle properties.

TABLE 2

| | | Electric capacity (mAh/g) | | | | Cycle prop- erties (%) |
|---|---|---|---|---|---|---|
| | | Second cycle | | 50th cycle | | |
| | Sample | Charge capacity | Discharge capacity | Charge capacity | Discharge capacity | |
| Example 1 | A | 224.7 | 245.8 | 170.1 | 173.4 | 70.6 |
| Example 2 | B | 229.6 | 250.5 | 204.3 | 207.1 | 82.6 |
| Example 3 | C | 220.2 | 242.6 | 195.1 | 200.0 | 82.4 |
| Comparative Example 1 | a | 223.0 | 259.9 | 161.3 | 164.3 | 63.2 |

INDUSTRIAL APPLICABILITY

The novel lithium titanate of the present invention is a material which has higher capacity than the existing spinel type $Li_4Ti_5O_{12}$, is advantageous to smooth intercalation and deintercalation of lithium, and is excellent for initial charge and discharge efficiency, cycle properties, particularly high temperature cycle properties, probably from the feature of the crystal structure of having one-dimensional tunnel space.

Further, the present lithium titanate containing copper and/or tin is more excellent in high temperature cycle properties. Therefore, it is high in practicality as an electrode material for an electricity storage device such as a lithium secondary battery.

Further, the method for producing the same does not require any special apparatus and can use an inexpensive raw material, thereby allowing a high-value-added material to be produced at a low cost.

Furthermore, the electricity storage device in which the novel lithium titanate of the present invention is used as the electrode active material of the electrode allows reversible lithium intercalation and deintercalation reaction, can perform charge and discharge cycles over a long period of time and even at high temperature, and can be expected to provide high capacity.

The invention claimed is:

1. A compound having a chemical composition of general formula:

$Li_2Ti_{18}O_{37}$ (formula 1).

2. The compound according to claim 1, wherein lithium deficiency is present in a range of a Ti/Li ratio of 14.0 at the maximum.

3. The compound according to claim 1, further containing copper and/or tin.

4. A compound in a form of a secondary particle which is prepared by aggregating primary particles according to claim 1.

5. The compound according to claim 1, having peaks at least at positions of 2θ of 14.1±0.5°, 24.8±0.5°, 28.7±0.5°, 30.3±0.5°, 43.4±0.5°, 44.6±0.5°, 48.5±0.5°, 53.0±0.5°, 58.3±0.5°, 61.4±0.5°, 63.1±0.5°, 65.2±0.5°, 67.5±0.5°, and 68.1±0.5°, in an X-ray powder diffraction pattern measured with CuKα radiation.

6. An electrode active material for an electricity storage device containing a compound according to claim 1.

7. A method for producing a compound according to claim 1, comprising the steps of: (1) allowing a compound having a chemical composition represented by general formula: $H_2Ti_{12}O_{25}$ (formula 2) to react with a lithium compound in a liquid phase to obtain a compound having a chemical formula represented by general formula: $H_{2/3}Li_{4/3}Ti_{12}O_{25}$ (formula 3); and (2) subjecting the compound represented by formula 3 to solid-liquid separation followed by thermal dehydration.

8. The method according to claim 7, wherein, in the first step, the reaction in the liquid phase is performed at a temperature of 80° C. or higher.

9. A method for producing a compound according to claim 3, comprising the steps of: (1) allowing a compound having a chemical composition of $H_2Ti_{12}O_{25}$ (formula 2) to react with a copper compound and/or a tin compound so that an amount of copper, an amount of tin, or a total amount thereof may be in a range of 0.001/1 to 0.1/1 relative to an amount of titanium contained in a compound of formula 1 to obtain a reaction product (A); (2) allowing the reaction product (A) to react with a lithium compound in a liquid phase so that an amount of lithium is equivalent or more to an amount of copper, an amount of tin, or a total amount thereof contained in the reaction product (A) to obtain a reaction product (B); and (3) subjecting the reaction product (B) to solid-liquid separation followed by thermal dehydration.

10. The method according to claim 9, wherein, in the second step, the reaction in the liquid phase is performed at a temperature of 80° C. or higher.

11. The method according to claim 9, wherein, in the second step, the reaction product (A) is allowed to react with the lithium compound so that a molar ratio of hydrogen to lithium contained in the reaction product (B) may be in a range of 0.5/1 to 1.5/1.

12. The method according to claim 7, wherein a temperature of the thermal dehydration is in a range of 300 to 600° C.

13. The method according to claim 7, comprising a step of obtaining a secondary particle of the compound having the chemical composition of general formula 1.

14. An electricity storage device comprising a positive electrode, a negative electrode, a separator, and an electrolyte, wherein the positive electrode or the negative electrode contains the electrode active material according to claim 6.

* * * * *